_United States Patent_ [19]

Pepperman, Jr. et al.

[11] 3,953,165

[45] Apr. 27, 1976

[54] FLAMEPROOFING RESINS FOR ORGANIC TEXTILES FROM ADDUCT POLYMERS

[75] Inventors: Armand B. Pepperman, Jr., Metairie; Donald J. Daigle, New Orleans; Sidney L. Vail, River Ridge, all of La.

[73] Assignee: The United States of America as represented by the Secretary of Agriculture, Washington, D.C.

[22] Filed: Aug. 22, 1974

[21] Appl. No.: 499,803

[52] U.S. Cl. .................................. 8/116 P; 8/196; 106/15 FP; 252/8.1; 427/341; 427/342; 427/390; 428/921
[51] Int. Cl.² ............... D06M 13/28; D06M 13/44; C09K 3/28
[58] Field of Search ............ 8/116 P, 196; 117/62.2, 117/136; 427/341, 342, 390; 106/15 FP; 252/8.1; 428/921

[56] References Cited
UNITED STATES PATENTS

| | | |
|---|---|---|
| 3,421,923 | 1/1969 | Guth .............................. 117/136 X |
| 3,619,113 | 11/1971 | Stockel et al. .................. 117/136 X |
| 3,644,083 | 2/1972 | Stockel et al. .................. 117/136 X |
| 3,784,356 | 1/1974 | Wagner ............................... 8/196 |
| 3,844,824 | 10/1974 | Reeves et al. ...................... 117/136 |
| 3,855,349 | 12/1974 | Date et al. ..................... 117/136 X |
| 3,864,076 | 2/1975 | Nachbur et al. .................... 8/116 P |

_Primary Examiner_—Michael R. Lusignan
_Attorney, Agent, or Firm_—M. Howard Silverstein; Max D. Hensley

[57] ABSTRACT

Hydroxymethylphosphine-ammonia and similar polymers, solubilized by hydroxymethylphosphonium salts and formaldehyde, were allowed to react with nitrogenous compounds such as urea, trimethylolmelamine and ammonia to (a) prepare flame-resistant polymers and (b) prepare flame-, glow-, wrinkle and shrink-resistant woven and knit textiles which contain 25% or more cellulosic fibers.

4 Claims, No Drawings

FLAMEPROOFING RESINS FOR ORGANIC TEXTILES FROM ADDUCT POLYMERS

This invention relates to flame-resistant polymers and to flame-resistant fibrous organic materials produced from these polymers. More, particularly, it relates to new phosphorus- and nitrogen-containing finishes obtained by solubilizing phosphorus- and nitrogen-containing polymers (or precipitates) and application of these solubilized polymers to fibrous organic materials. It further provides a process for preparing nitrogen- and phosphorus-containing solubilized polymers and methods of their utilization in the production of new flame-resistant polymers and for the production of flame-resistant fibrous organic materials, such as cellulose and cellulose-containing textiles.

As employed throughout the specifications and claims of this invention, the term "adduct polymer" refers to these solubilized polymers, i.e., the product formed by solubilizing unoxidized polymers containing phosphorus and nitrogen in solutions containing formaldehyde and a hydroxymethylphosphonium salt. The chemistry involved in the solution of these polymers by the addition of formaldehyde and a hydroxymethylphosphonium salt is not known, but it is believed that chemical reactions occur which modify the polymers by altering the chain length and/or by addition of the reactants to the polymer or products therefrom.

The abbreviation THP refers to the compound tris(-hydroxymethyl)phosphine, $(HOCH_2)_3P$. The term tetrakis(hydroxymethyl)phosphonium salt refers to that class of compounds in which four hydroxymethyl groups are bonded to a phosphorus atom which is in the phosphonium state, thus having a positive charge associated with it. The anion can be the anion of any organic or inorganic acid such as acetic, oxalic, hydrochloric or phosphoric. The abbreviation $^{Th}pc$ refers to the compound tetrakis(hydroxymethyl)phosphonium chloride. The term tetrakis(hydroxymethyl)phosphonium hydroxide or THPOH refers to a solution prepared by neutralizing any tetrakis(hydroxymethyl)phosphonium salt with any suitable base, inorganic or organic, such as sodium hydroxide or triethanolamine.

Copending application Ser. No. 499,806, filed Aug. 22, 1974 relates to the production of soluble adduct polymers and to the use of these polymers with phenols and substituted phenols for the treatment of organic fibrous materials in a heat cure procedure for the production of flame resistant organic fibrous textiles. These polymers were solubilized by the use of formaldehyde and a hydroxymethylphosphonium salt.

Copending application Ser. No. 499,804 filed Aug. 22, 1974 relates to the production of soluble adduct polymers and the use of these polymers with phenols and substituted phenols for the treatment of organic fibrous materials in a heat cure procedure for the production of flame resistant organic fibrous textiles. These adduct polymers were solubilized by formaldehyde and an acid, such as acetic or hydrochloric.

Copending application Ser. No. 499,807, filed Aug. 22, 1974 relates to the production and use of soluble adduct polymers and to the use of these polymers with certain nitrogenous compounds for the treatment of organic fibrous materials in either a heat cure or chemical cure procedure for the production of flame-resistant organic fibrous textiles. These adduct polymers were solubilized by formaldehyde and an acid, such as acetic or hydrochloric.

A primary object of the present invention is to provide adduct polymers which are stable toward further reaction during storage but which are capable of reaction with certain nitrogenous agents to produce flame-resistant polymers and flame-resistant organic textiles and to provide flame-resistant organic textile structures by insolubilizing polymer adducts in the textile structure without the need for heating the textile which generally reduces the strength of the so-treated product.

Polymers of various types can be prepared by reacting tetrakis(hydroxymethyl)phosphonium salts, tris(-hydroxymethyl)phosphine, tetrakis(hydroxymethyl)phosphonium hydroxide or combinations thereof with ammonia, diamines, such as ethylenediamine and 1,6-hexamethylenediamine, hexamethylenetetramine or combination thereof. We have now discovered that these polymers can be solubilized by solutions containing formalin and a hydroxymethylphosphonium compound. We have also discovered that these adduct polymers can be further reacted with nitrogenous compounds which contain at least two members of the group consisting of hydrogen atoms or methylol radicals attached to the trivalent nitrogen to produce nitrogen and phosphorus containing polymers or flame- and wrinkle-resistant textile products. We have also discovered that these soluble adduct polymers can react and be insolubilized within or on fibrous organic textiles by impregnating the textile with the soluble adduct polymer, then drying the impregnated product and finally exposing the the dry textile to a gaseous amine, such as ammonia. The resulting insolubilized nitrogen and phosphorus containing polymer is durable to laundering and drycleaning.

More specifically, the products and processes of our invention may be described as follows: (1) insoluble polymers are prepared by reacting THP, either in the presence of free formaldehyde or not, with ammonia, diamines or hexamethylenetetramine or mixtures of these. Insoluble polymers may also be prepared by utilizing tetrakis(hydroxymethyl)phosphonium salts in lieu of THP. The mole ratio may vary from 1:4 to 4:1 of amine to phosphorus compound. The preferred molar ratio is 1:1 with THP and tetrakis(hydroxymethyl)phosphonium hydroxide and 2:1 with tetrakis(hydroxymethyl)phosphonium chloride. (2) To produce clear solutions of these polymers, the polymer is mixed with formalin solution and a tetrakis(hydroxymethyl)phosphonium salt. The ratio of formaldehyde added to phosphorus contained in the polymer can vary from 1:4 to 4:1. The preferred ratio is 1:1. The ratio of phosphonium salt added to the phosphorus contained in the polymer can vary from 1:10 to 2:1 but the preferred ratio is 1:1. (3) To produce insoluble polymers in accordance with this invention the adduct polymer is reacted with a nitrogenous compound containing at least two members of the group consisting of hydrogen atoms or methylol radicals attached to a trivalent nitrogen atom. The reaction is carried out by dissolving the nitrogenous compound in the solution containing the adduct polymer and then heating as needed until a viscous solution and finally a solid polymer is produced. The polymers produced by this process are insoluble and flame-resistant. (4) To produce chemically cured polymers, in accordance with this invention, the adduct polymer is reacted with a nitrogenous compound containing at least two members of the group consisting of hydrogen atoms attached to trivalent nitrogen. The reaction is carried out by adding the nitrogenous compound to the solution containing the adduct polymer. The insoluble polymer forms almost instantaneously and the polymers produced by this process are insoluble and flame resistant. (5) To produce flame resistant organic textiles, the textile structure is wetted with a solution containing the adduct polymer and nitrogenous compound containing at least two members of the group consisting of hydrogen atoms or methylol radicals attached to trivalent nitrogen atoms, then drying and heating the textile at an elevated temperature ranging from about 90° to 170°C for a period of time necessary to promote reaction of the adduct polymer and the nitrogenous agent, within or on the textile structure. (6) To produce flame resistant organic textiles the solution containing the adduct polymer may or may not be neutralized by an organic or an inorganic base to a high pH before impregnating or wetting the fibrous organic textile structure. The textile is dried partially or completely at a temperature from about 70° to 130°C. The dried fabric is exposed to sufficient vapors of an amine to react and insolubilize the adduct polymer in or on the textile structure. Textile structures treated in accordance with this process can exhibit tensile strength properties about equal to or greater than their original tensile properties if the pH of the treating solution is between 6 and 8 preferably 7.

Nitrogenous compounds suitable for use in preparing the polymers or solutions, to produce flame-resistant organic textiles, are virtually any essentially monomeric nitrogenous compound which contains at least two members of the group consisting of hydrogen atoms or methylol radicals attached to trivalent nitrogen. Suitable nitrogenous amides include cyanamide, formamide, urea, thiourea, melamine, acrylamide, octadecylamide, and the methylol derivatives of these amides. Sulfonamides and phosphoramides are also suitable.

Gaseous nitrogenous compounds suitable for reacting with and insolubilizing the adduct polymers in the textile structure include ammonia, methylamine, and ethylamine. While the preferred technique for applying ammonia or these amines is by forcing the gas through the textile structure, other techniques can be used such as merely exposing the textile to an atmosphere composed essentially of ammonia or a suitable amine.

The preferred solvent is water, however, alcohols such as methanol, ethanol and isopropanol as well as dimethylformamide, dimethylsulfoxide and the like may be used to replace some of the water used as the solvent. Catalysts are generally not needed to promote the reaction of the adduct polymer with the nitrogenous compounds to form the insoluble polymers. The pH of the reacting system is dependent upon the acid and the amount used.

The preferred relative amounts of adduct polymer and nitrogen compounds used for reaction can be calculated by assuming one mole of phosphorus which is contained in the adduct polymer reacts with one mole of the nitrogenous compound.

All of the polymers produced in accordance with this invention contain oxidizable phosphorus which can be oxidized with oxidants such as peroxides, perborates and peracids to the phosphine oxide state. Generally, a 0.5% to 3% solution of the oxidizing agent is adequate.

The following examples illustrate but do not limit the scope of this invention.

EXAMPLE 1

The original or phosphine polymers were prepared by reacting the appropriate phosphorus compound with the amine or diamine as described in Table I. All of the polymers were filtered from the mother liquor, washed with water, ethanol, and methanol and left to air dry for eight days. The polymers were then bottled and used to prepare the adduct polymers. In Table II the preparation of the adduct polymer from formaldehyde, tetrakis(hydroxymethyl)phosphonium salt, and polymer are described. Organic fibrous materials were impregnated with a solution of the adduct polymer and then dried in an oven. The dried fibrous structures were then exposed to either gaseous alkyl amines or ammonia to react and insolubilize a polymer in or on the fibers. All of the products contained phosphorus and nitrogen after washing in water and drying and exhibited flame resistance as measured by the match test [see Textile Research J. 27, 294–299 (1957)]. In Table III are shown the fibrous materials treated, the polymer adduct solution of Table II used to treat the fibrous product, the amine used to react and insolubilize a polymer, the polymers formed, and a brief description of each product.

EXAMPLE 2

The nitrogenous agents were added to solutions of the adduct polymer as described in Table II to produce solutions as described in Table IV. These solutions were used to (a) make insoluble polymers and (b) produce flame resistant organic fibrous materials. Aliquots of the solutions were heated from about 120°–150°C to produce flame resistant insoluble polymers. These are described in Table V. To produce flame resistant fibrous materials the textile structures were impregnated with the solutions of Table IV, then heated to produce insoluble polymers in or on the fibrous structures. In Table VI are shown the fibrous materials treated, the solution of Table IV used to treat the fibrous material and a brief description of each product.

Table I

| Polymer No. | Phosphine Polymers Reactants | % P in Polymer |
|---|---|---|
| 1 | 1500 g. 40% THPOH (Thpc neutralized with sodium hydroxide); 205 g. ammonium hydroxide (NH₄OH) (29% ammonia) | 31.8 |
| 2 | 238 g. Thpc (80%); 238 g. water; 175 g. NH₄OH (29% ammonia) | 23.4 |
| 3 | 160 g. THP (80%); 200 g. water; 105 g. hexamethylenetetramine | 29.9 |
| 4 | 573 g. 40% THPOH (Thpc neutralized with sodium hydroxide); 61.2 g. ethylenediamine (98%) | 29.5 |
| 5 | 573 g. 40% THPOH (Thpc neutralized with sodium hydroxide); 162 g. 1,6-hexamethylenediamine (70%) | 21.5 |

Table II

| Designation of Adduct Polymer Solutions | Reactants (Adduct Polymer Solutions) | Time Required for Complete Solution |
|---|---|---|
| A | 80 g. polymer No. 1; 50 g. THP acetate (60%)-phosphate (40%) (60%); 60 g. formalin (37.5%); 140 g. water | 4 hours |
| B | 40 g. polymer No. 2; 25 g. THP oxalate (70%); 30 g. formalin (37.5%); 60 g. water | 4 hours |
| C | 40 g. polymer No. 3; 20 g. Thpc (80%); 30 g. formalin (37.5%); 60 g. water | 4 hours |
| D | 25 g. polymer No. 4; 25 g. THP acetate (60%)-phosphate (40%) (60%); 25 g. formalin (37.5%); 60 g. water | 10 hours |
| E | 25 g. polymer No. 5; 25 g. Thpc (80%); 25 g. formalin (37.5%); 60 g. water | 10 hours |

Table III

| Designation of Copolymer Solution | Composition of Solution (Reactant Solutions) |
|---|---|
| F | 50 g. soln. A, 10 g. urea, 40 g. water |
| G | 20 g. soln. A, 4 g. thiourea, 16 g. water |
| H | 20 g. soln. A, 4 g. acrylamide, 16 g. water |
| I | 20 g. soln. A, 4 g. TMM, 16 g. water |
| J | 20 g. soln. H, 8 g. cyonamide (50%), 12 g. water |
| K | 20 g. soln. B, 4 g. urea, 16 g. water |
| L | 20 g. soln. C, 4 g. thiourea, 16 g. water |
| M | 20 g. soln. D, 4 g. thiourea, 16 g. water |
| N | 20 g. soln E, 4 g. urea, 16 g. water |

Table IV

| Copolymer Solution Used (Designation from Table III) | Description of Insoluble Polymer Resulting from Heating the Reactant Solution from About 120–150°C for About 1–10 Minutes |
|---|---|
| F | Clear white hard polymer, insoluble on water and ethanol. Flame and glow resistant. Contains nitrogen and phosphorus. |
| G | " |
| H | " |
| I | " |
| J | Tan, foamy polymer insoluble in water and ethanol. Flame and glow resistant. Contains nitrogen and phosphorus. |
| K | Clear, white, hard polymer, insoluble in water and ethanol. Flame and glow resistant. Contains nitrogen and phosphorus. |
| L | " |
| M | Gold hard polymer insoluble in water and ethanol. Flame and glow resistant. Contains nitrogen and phosphorus. |
| N | Clear, yellow hard polymer, insoluble in water and ethanol. Flame and glow resistant. Contains nitrogen and phosphorus. |
| A[a] | White hard polymer insoluble in water and ethanol. Flame and glow resistant. Contains nitrogen and phosphorus. |

[a] Polymer was formed by addition of ammonia or ammonium hydroxide to solution A.

Table V

Preparation of Flame-Resistant Fibrous Organic Materials Through Use of Adduct Polymer Solution and a Chemical Cure.

| Fibrous Material Treated | Adduct Polymer Solution See Table II | Amine Used to Cure Adduct | Approx. Add-on of Insoluble Polymer % | Hand | Strength | Color | Match Test Angle |
|---|---|---|---|---|---|---|---|
| Cotton Flannelette | A | NH$_3$ atm. | 9 | Good | Good | White | 150 |
| PE/Cotton Blend (50/50) | A | " | 10 | " | " | " | 180 |
| Cotton Sateen | A | " | 11 | " | " | " | 180 |
| Cotton Sateen | B | " | 9 | " | " | " | 100 |
| Cotton Sateen | C | " | 14 | " | " | " | 135 |
| PE/Cotton Blend (50/50) | A | Methylamine | 48 | " | " | " | 180 |
| Cotton Sateen | E | " | 34 | " | " | " | 180 |
| Cotton Sateen | E | NH$_3$ | 25 | " | " | " | 180 |
| Cotton Sateen | D | NH$_3$ | 38 | Crisp | " | Slightly Yellow | 180 |

Table VI

| Fabric Treated | Adduct or Copolymer Solution Applied to Fabric | Conditions for Depositing Insoluble Polymer in Fabric | Approximate Add-On of Retardant After Washing the Treated Textile | Hand | Strength | Color | Match Test Angle |
|---|---|---|---|---|---|---|---|
| PE/Cotton Blend 50/50 | F | 150° 2 min. | 4 | Good | Good | White | 120 |
| Rayon | F | " | 5 | " | " | " | 120 |
| Cardboard | F | " | 9 | " | " | " | 90 |
| Paper | F | " | 4 | " | " | " | 100 |
| Wool | F | " | 14 | " | " | " | 180 |
| Jute | F | " | 3 | " | " | " | 90 |
| Cotton Printcloth | G | " | 3 | " | " | " | 90 |
| PE/Cotton Blend 50/50 | H | " | 8 | " | " | " | 80 |
| Cotton Sateen | I | " | 19 | Crisp | " | " | 180 |
| PE/Cotton Blend 50/50 | I | " | 32 | " | " | " | 180 |

Table VI-continued

| Fabric Treated | Adduct or Copolymer Solution Applied to Fabric | Conditions for Depositing Insoluble Polymer in Fabric | Approximate Add-On of Retardant After Washing the Treated Textile | Properties of Treated Fabric | | | |
|---|---|---|---|---|---|---|---|
| | | | | Hand | Strength | Color | Match Test Angle |
| Cotton Sateen | J | '' | 11 | '' | '' | '' | 135 |
| PE/Cotton Blend 50/50 | J | '' | 15 | '' | '' | '' | 135 |
| Cotton Sateen | K | '' | 18 | '' | '' | '' | 180 |
| Cotton Sateen | L | '' | 21 | '' | '' | Sl. Yellow | 180 |
| Cotton Printcloth | M | '' | 53 | Crisp | '' | White | 180 |
| Cotton Printcloth | N | '' | 47 | '' | '' | Slightly Yellow | 180 |

We claim:

1. A process for flameproofing organic textiles, comprising:
   a. reacting a hydroxymethyl phosphonium compound with ammonia or an amine to form an insoluble adduct polymer;
   b. mixing said polymer with a formaldehyde solution and a hydroxymethyl phosphonium compound at a mole ratio of formaldehyde to polymer phosphorus of from 1:4 to 4:1 and at a mole ratio of phosphonium compound to polymer phosphorus of from 1:10 to 2:1, thereby dissolving said polymer; and
   c. reacting in contact with an organic textile said dissolved polymer and a nitrogenous compound containing at least two members of the group consisting of hydrogen atoms or methylol radicals attached to a trivalent atom.

2. The process of claim 1 wherein said dissolved polymer and said compound are mixed and applied to said fabric before being reacted.

3. The process of claim 1 wherein said dissolved polymer is applied to said textile and then reacted with said ammonia or gaseous amine.

4. The product produced by the process of claim 1.

* * * * *